(12) United States Patent
Liu et al.

(10) Patent No.: US 11,455,813 B2
(45) Date of Patent: Sep. 27, 2022

(54) PARAMETRIC TOP-VIEW REPRESENTATION OF COMPLEX ROAD SCENES

(71) Applicant: NEC Laboratories America, Inc., Princeton, NJ (US)

(72) Inventors: Buyu Liu, Cupertino, CA (US); Bingbing Zhuang, Sunnyvale, CA (US); Samuel Schulter, New York, NY (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 4 days.

(21) Appl. No.: 17/096,111

(22) Filed: Nov. 12, 2020

(65) Prior Publication Data
US 2021/0150203 A1    May 20, 2021

Related U.S. Application Data

(60) Provisional application No. 62/935,319, filed on Nov. 14, 2019.

(51) Int. Cl.
*G06V 30/422*    (2022.01)
*G06T 7/00*    (2017.01)
*G06V 40/12*    (2022.01)

(52) U.S. Cl.
CPC .......... *G06V 30/422* (2022.01); *G06T 7/0002* (2013.01); *G06V 40/1347* (2022.01); *G06T 2207/10032* (2013.01)

(58) Field of Classification Search
CPC .. G06V 30/422; G06V 40/1347; G06V 10/48; G06V 10/82; G06V 20/56;
(Continued)

(56) References Cited

U.S. PATENT DOCUMENTS 6,215,898 B1 *  4/2001  Woodfill ................. G06T 7/593
                                                    348/E13.016
6,757,445 B1 *  6/2004  Knopp ..................... G01C 11/06
                                                    382/296

(Continued)

OTHER PUBLICATIONS

Greff et al., "LSTM: A Search Space Odyssey", arXiv:1503.04069v2 [cs.NE] Oct. 4, 2017, pp. 1-12.
(Continued)

*Primary Examiner* — Xuemei G Chen
(74) *Attorney, Agent, or Firm* — Joseph Kolodka

(57) ABSTRACT

Systems and methods are provided for producing a road layout model. The method includes capturing digital images having a perspective view, converting each of the digital images into top-down images, and conveying a top-down image of time t to a neural network that performs a feature transform to form a feature map of time t. The method also includes transferring the feature map of the top-down image of time t to a feature transform module to warp the feature map to a time t+1, and conveying a top-down image of time t+1 to form a feature map of time t+1. The method also includes combining the warped feature map of time t with the feature map of time t+1 to form a combined feature map, transferring the combined feature map to a long short-term memory (LSTM) module to generate the road layout model, and displaying the road layout model.

18 Claims, 8 Drawing Sheets

(58) Field of Classification Search
CPC ...... G06V 20/588; G06V 20/70; G06V 20/64; G06T 7/0002; G06T 2207/10032; G06T 2207/10016; G06T 2207/10024; G06T 2207/20076; G06T 2207/20081; G06T 2207/30252; G06T 7/11; G06T 7/143; G06T 7/194; G06T 7/536; G06T 7/579; G06K 9/6232
See application file for complete search history.

(56) References Cited

U.S. PATENT DOCUMENTS

| | | | | |
|---|---|---|---|---|
| 7,274,311 | B1* | 9/2007 | MacLeod | G08G 1/096716 340/995.13 |
| 10,719,940 | B2* | 7/2020 | Cao | G06T 7/248 |
| 11,231,283 | B2* | 1/2022 | Behrendt | G06V 20/588 |
| 2004/0153671 | A1* | 8/2004 | Schuyler | G07C 9/28 726/9 |
| 2010/0246901 | A1* | 9/2010 | Yang | B60R 1/00 382/154 |
| 2016/0054452 | A1* | 2/2016 | Cosatto | G01S 17/89 701/412 |
| 2018/0224863 | A1* | 8/2018 | Fu | G06V 20/588 |
| 2018/0365835 | A1* | 12/2018 | Yan | G06V 10/26 |
| 2019/0050648 | A1* | 2/2019 | Stojanovic | G06V 20/13 |
| 2019/0064851 | A1* | 2/2019 | Tran | G08G 5/0086 |
| 2019/0095731 | A1 | 3/2019 | Vernaza et al. | |
| 2019/0096125 | A1* | 3/2019 | Schulter | G06T 15/20 |
| 2019/0138814 | A1 | 5/2019 | Schulter et al. | |
| 2019/0228266 | A1 | 7/2019 | Habibian et al. | |
| 2019/0286921 | A1* | 9/2019 | Liang | G06F 16/55 |
| 2020/0034664 | A1* | 1/2020 | Jacobs | G06N 3/0454 |
| 2020/0098135 | A1* | 3/2020 | Ganjineh | G06F 16/29 |
| 2020/0151465 | A1* | 5/2020 | Levi | G08G 1/00 |
| 2020/0175053 | A1* | 6/2020 | Zheng | G06V 10/454 |
| 2020/0238929 | A1* | 7/2020 | Wippler | B60W 50/14 |
| 2020/0349722 | A1* | 11/2020 | Schmid | G06N 3/0481 |
| 2020/0355820 | A1* | 11/2020 | Zeng | G01S 7/417 |
| 2020/0394838 | A1* | 12/2020 | Bulan | G01C 21/3852 |
| 2021/0056685 | A1* | 2/2021 | Zhang | G06T 7/194 |
| 2021/0061064 | A1* | 3/2021 | Soni | H04W 4/021 |
| 2021/0166034 | A1* | 6/2021 | Petersson | G06V 40/19 |

OTHER PUBLICATIONS

Li et al., "Stereo R-CNN based 3D Object Detection for Autonomous Driving", arXiv:1902.09738v2 [cs.CV] Apr. 10, 2019, 9 pages.
Li et al., "Object Bank: A High-Level Image Representation for Scene Classification & Semantic Feature Sparsification", Advances in Neural Information Processing Systems 23: 24th Annual Conference on Neural Information Processing Systems 2010, Dec. 2010, pp. 1-9.
Liu et al., "Understanding Road Layout from Videos as a Whole", 2020 IEEE/CVF Conference on Computer Vision and Pattern Recognition (CVPR), Jan. 2020, 3 pages.
Graves et al., "Framewise Phoneme Classification with Bidirectional LSTM and Other Neural Network Architectures", Proceedings. 2005 IEEE International Joint Conference on Neural Networks, 2005, Jul. 2005, 8 pages.
Morgado et al., "Semantically Consistent Regularization for Zero-Shot Recognition", arXiv:1704.03039v1 [cs.CV] Apr. 10, 2017, 10 pages.
Schulter et al., "Learning to Look around Objects for Top-View Representations of Outdoor Scenes", arXiv:1803.10870v1 [cs.CV] Mar. 28, 2018, pp. 1-28.
Wang et al., "A Parametric Top-View Representation of Complex Road Scenes", arXiv:1812.06152v2 [cs.CV] Apr. 18, 2019, 9 pages.
Zhao et al., "Pyramid Scene Parsing Network", arXiv:1612.01105v2 [cs.CV] Apr. 27, 2017, pp. 1-11.

* cited by examiner

PARAMETRIC TOP-VIEW REPRESENTATION OF COMPLEX ROAD SCENES

RELATED APPLICATION INFORMATION

This application claims priority to Provisional Application No. 62/935,319, filed on Nov. 14, 2019, and incorporated herein by reference in its entirety.

BACKGROUND

Technical Field

The present invention relates to systems and methods for generating parametric top-view representation of road scenes and more particularly to systems and methods of capturing and converting perspective video frames into a top-down view of complex road scenes.

Description of the Related Art

Semantic segmentation refers to the process of linking each pixel in an image to a class label. These labels can identify a person, car, tree, lamp, mailbox, etc. Semantic segmentation can be considered image classification at a pixel level. Instance segmentation can label the separate instances of a plurality of the same object that appears in an image, for example, to count the number of objects. Semantic segmentation and instance segmentation can allow models to understand the context of an environment. The deficiency of segmentation labels is one of the main obstacles to semantic segmentation in the wild.

Long short-term memory (LSTM) is an artificial recurrent neural network (RNN) architecture that has feedback connections.

SUMMARY

According to an aspect of the present invention, a method is provided for producing a road layout model. The method includes capturing a plurality of sequential digital images using a video camera, wherein the digital images are of a perspective view. The method also includes converting each of the plurality of sequential digital images into a top-down view image using a processor, and conveying a top-down view image of time t to a neural network that performs a feature transform on the top-down view image of time t to form a feature map of time t. The method also includes transferring the feature map of the top-down view image of time t to a feature transform module configured to warp the feature map of time t to a time t+1, and conveying a top-down view image of time t+1 to the neural network that performs a feature transform on the top-down view image of time t+1 to form a feature map of time t+1. The method also includes combining the warped feature map of time t with the feature map of time t+1 to form a combined feature map, and transferring the combined feature map to a long short-term memory (LSTM) module to generate the road layout model. The method also includes displaying the road layout model to a user.

According to another aspect of the present invention, a system is provided for producing a road layout model. The system includes, one or more processor devices; a memory in communication with at least one of the one or more processor devices; and a display screen; wherein the processing system includes a graphical modeler configured to receive as input a plurality of sequential digital images, wherein the digital images are of a perspective view, convert each of the plurality of sequential digital images into a top-down view image using a processor, convey a top-down view image of time t to a neural network that performs a feature transform on the top-down view image of time t to form a feature map of time t, and convey a top-down view image of time t+1 to the neural network that performs a feature transform on the top-down view image of time t+1 to form a feature map of time t+1; a feature transform module configured to receive the feature map of the top-down view image of time t and warp the feature map of time t to a time t+1; a combiner configured to combine the warped feature map of time t with the feature map of time t+1 to form a combined feature map; a long short-term memory (LSTM) module configured to receive the combined feature map and to generate the road layout model; and the processor device is configured to transmit the road layout model to the display screen for presentation to a user.

According to another aspect of the present invention, a non-transitory computer readable storage medium comprising a computer readable program for producing a road layout mode is provided. The computer readable program causes the computer to perform the steps of: capturing a plurality of sequential digital images using a video camera, wherein the digital images are of a perspective view; converting each of the plurality of sequential digital images into a top-down view image using a processor; conveying a top-down view image of time t to a neural network that performs a feature transform on the top-down view image of time t to form a feature map of time t; transferring the feature map of the top-down view image of time t to a feature transform module configured to warp the feature map of time t to a time t+1; conveying a top-down view image of time t+1 to the neural network that performs a feature transform on the top-down view image of time t+1 to form a feature map of time t+1; combining the warped feature map of time t with the feature map of time t+1 to form a combined feature map; transferring the combined feature map to a long short-term memory (LSTM) module to generate the road layout model; and displaying the road layout model to a user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
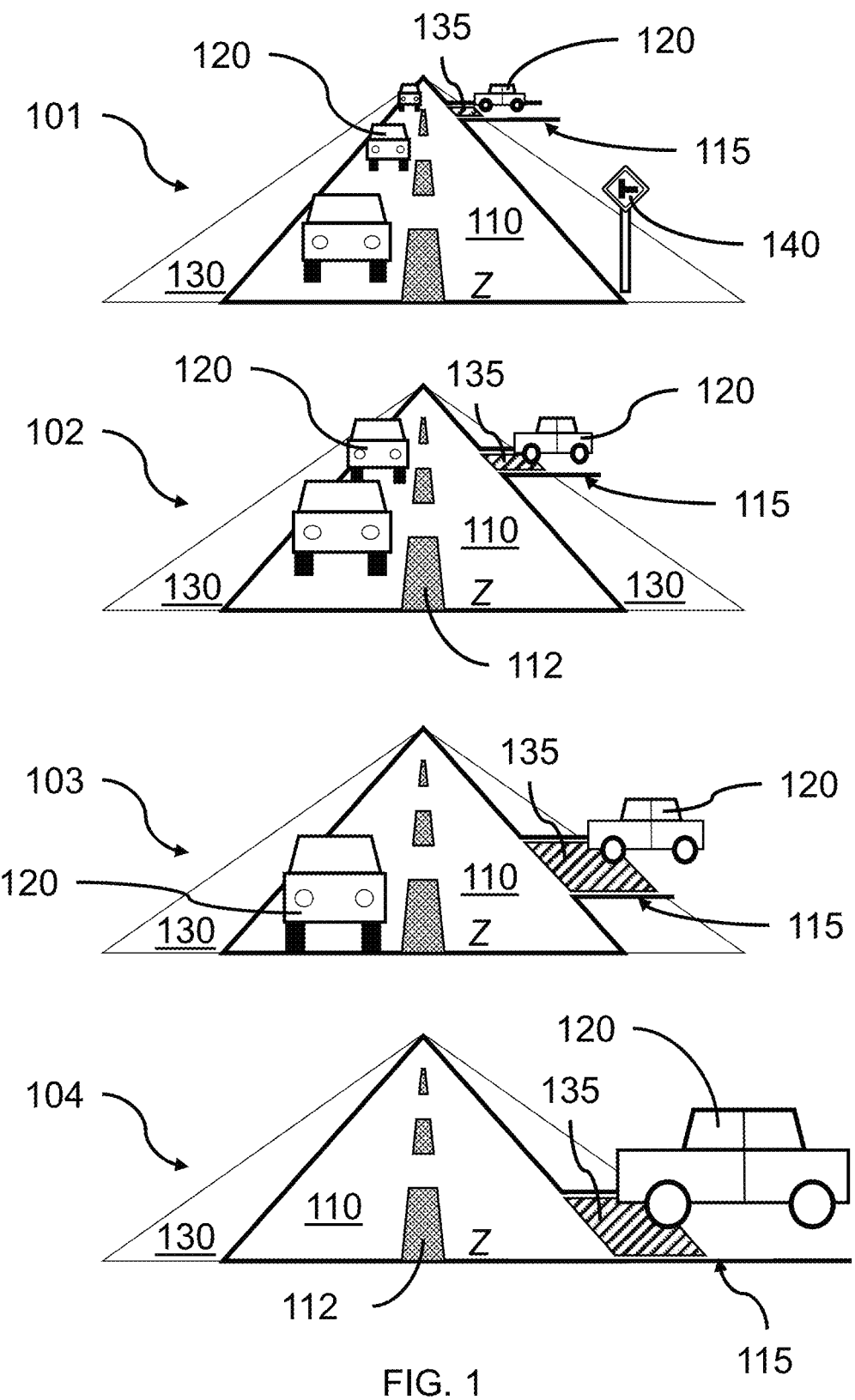
FIG. 1 is a diagram illustrating a road in a perspective view, in accordance with an embodiment of the present invention.

In accordance with embodiments of the present invention, systems and methods are provided for 3D road scene understanding in videos through a holistic consideration of local, global, and consistency cues, where given a video sequence, the road layout of each frame can be predicted both accurately and coherently. Videos can provide the opportunity to exploit more cues such as temporal coherence, dynamics, and context. Deep learning-based perception systems can provide pixel accurate semantic segmentation and (monocular) depth estimation in the perspective view of a scene. Semantic segmentation involves Image Classification to recognize objects and existing properties in an image; and Image Segmentation, where exactly what is in the image can be recognize and understood at a pixel level view. In semantic segmentation annotated images, each pixel in an image belongs to and is associated with a single class, as opposed to object detection where the bounding boxes of objects can overlap over each other.

In various embodiments, the layout of complex road scenes can be inferred from video sequences. Embodiments of the present invention relate to inferring the layout of complex road scenes utilizing images captured by a single camera as input. Interpretable attributes of the layout of complex road scenes can be interpreted from the single camera view. Attributes of road scenes can include, for example, the topology of the road, the number of lanes, on-coming traffic, sidewalks, crosswalks, and the distances to scene elements. In various embodiments, the attributes can be grouped into categories of Lanes, Topology, Walkable, etc.

In various embodiments, a top-view road attribute prediction problem can be formulated and a road layout can be predicted from each frame of video both accurately and consistently using a parameterized model of road layouts in a top-view representation. A deep neural network can be trained to infer a scene model's parameters. The top-view representations can be formulated for road segments that can be straight or curved portions of a roadway.

In various embodiments, camera motion in videos of the roadway can be utilized, and context information can be incorporated by introducing road participants, e.g. objects, into the model. The model can also encode both local (i.e., individual frames (past)) and global (i.e., entire video (future)) information from past and future frames and cues. In various embodiments, the model incorporates context cues and/or long-term information. Context cues can be used in scene attribute prediction in the top-view. Such cues can be represented and obtained with 3D object detection and can provide useful priors and constraints for layout estimation in the top-view. Object information can be obtained by applying 3D object localization methods on each frame, and can be incorporated into model input. A "prior" refers to a prior probability distribution.

In accordance with embodiments of the present invention, systems and methods including at least one recurrent neural network (RNN), for example, Long Short-Term Memory (LSTM), which can not only process single data points (such as individual images), but also entire sequences of data, such as a video, and at least one Feature Transform Module (FTM), which can take the camera motion into consideration when aggregating information along videos are provided. Introducing LSTM and FTM improves the prediction accuracy and consistency in videos, which can outperform the state of the art by a large margin. LSTMs can implicitly enforce the prediction consistency without the explicit knowledge of motion, and the Feature Transform Module (FTM) can warp features with regards to camera motion and aggregate them between consecutive frames.

In accordance with embodiments of the present invention, systems and methods for a neural network structure that can enforce temporal smoothness in videos is provided. By explicitly and implicitly encoding temporal smoothness constraints, the proposed neural network can improve the prediction accuracy and consistency. The Feature Transform Module (FTM) can explicitly aggregate information with reference to estimated camera motion and encourages consistency on the feature level. Information obtained locally from individual frames can be combined with the information obtained globally from entire video sequences. Unlike prior methods that estimate flow in the perspective view of the scene, The Feature Transform Module (FTM) and Long Short-Term Memory (LSTM) modules work in the top-view space.

In various embodiments, a deep learning framework can leverage training data from both domains, real and simulated, to infer the parameters of a scene model. A conditional random field (CRF) can enforce coherence between related parameters of the scene model and encourage temporal smoothness for video inputs. OpenStreetMaps can be used for training data, and to gather ground truth (referring to information provided by direct observation (i.e. empirical evidence)) for an RGB image. A combination of manual annotation and simulation can be used for training. For sequential data, many attributes may stay constant over a long period of time.

In various embodiments, the modeling can be applicable to both offline (after a multi-frame video sequence has been captured) and online (as a video sequence is being captured; occurring in real time) scene understanding in videos. Applications like forensic analysis of traffic scenes and driver behavior studies using commodity cameras are examples where road layout estimation is used with the entire videos available.

Referring now in detail to the figures in which like numerals represent the same or similar elements and initially to FIG. 1, a high-level system/method a diagram illustrating a road in a perspective view is shown, in accordance with an embodiment of the present invention.

Understanding complex layouts of the 3D world can be a part of applications for robot navigation, driver assistance systems, and autonomous driving. Models can also be used for accident recreation and insurance investigations. Applications like forensic analysis of traffic scenes and driver behavior studies using commodity cameras are examples where road layout estimation is required, and entire video(s) can be available.

In various embodiments, a sequence of images 101, 102, 103, 104 of a roadway 110 can be captured as a video, where the images 101, 102, 103, 104 can be a perspective view of a roadway 110. The images can be captured, for example, from another vehicle on the roadway 110 mounting a forward-looking video camera, where the video camera may be traveling with the associated vehicle along a predetermined direction on the roadway. The model can compensate for the relative motion of the camera.

In various embodiments, the features of and along the roadway can include, but not be limited to, lane markings/dividers 112, left side and/or right side intersecting roadways 115, vehicles 120 (e.g., cars, trucks, busses, etc.) traveling on the roadway 110 and/or on intersecting roadways 115, shoulders and/or sidewalks 130 along the edge(s) of the roadway 110, crosswalks 135, and traffic signs 140.

In various embodiments, the model can describe road scenes in a semantic top-view representation, where the camera can be at a position towards the bottom center in each frame, and capture perspective views of the roadway 110. All features in the images captured by the camera can be located relative to the camera position, "Z". A "main road", where the camera is facing, can be differentiated from "side road(s)s" within the camera view, that branch from the main road. The main road can be defined by a set of lanes, one- or two-way traffic, delimiters, shoulders, and sidewalks. Identifying and modeling one or two side roads (one on the left and one on the right of the main road) along with distances to each one of them can provide the flexibility to model both 3-way and 4-way intersections. An additional attribute can determine whether the main road ends after the intersection, which yields a T-intersection. All roads may consist of at least one lane having a width, and intersections can be a joining of the main road with one or more side roads. Optional delimiters (e.g., shoulders, bike lanes, curbs, island, etc.) next to the outer most lanes can separate the road proper from a sidewalk or unpaved, open ground.

In various embodiments, crosswalks 135 can be modeled at all potential intersections and side roads 115. The width(s) of crosswalks 135 can be modeled as a parameter. The existence of a crosswalk 135 or side road 115 would be a binary attribute, which can be easy to annotate, however, annotating the exact width of a crosswalk or side road can require the knowledge of scene geometry, which can be more difficult when only a perspective RGB image is available.

In various embodiments, the parametric representation of the perspective view of the roadway can include a set of parameters, $\Theta$, grouped into different types. In various embodiments, three different types of scene attributes/variables can include, for example, $M^b=14$ binary variables $\Theta_b$, $M^m=2$ multi-class variables $\Theta_m$, and $M^c=22$ continuous variables $\Theta_c$, where M is the scalar value of the number of parameters/variables (e.g., $M^b=14$, $M^m=2$, $M^c=22$), $\Theta$ represents the parameters/variables, b indicates binary values, m indicates multiclass values, and c indicates continuous values for the associated variable(s). These parameters/variables can represent a large variety of road scene layouts. Denoting the scene model parameters $\Theta=\{\Theta_b, \Theta_m, \Theta_c\}$, then parameter $\Theta^t$ can be predicted, where $\Theta^t$ is the scene parameters of the t-th frame of a video, coherently and accurately for all $t \in \{1, \ldots, T\}$, where T is the number of frames in a video. The underlying feature representation can be augmented and temporal information from videos can be aggregated for more temporally consistent and robust predictions.

A list of model parameters can include, but not be limited to,

Binary Parameters/Variables:

B1—Is the main road curved? (Yes/No);

B2—Is the main road a one-way? (Yes/No);

B3—Does the main road have a delimiter? (Yes/No);

B4—Is there a delimiter between the road and side walks? (Yes/No);

B5—Does a sidewalk exist on the left of the main road? (Yes/No);

B6—Does a sidewalk exist on the right of the main road? (Yes/No);

B7—Does a crosswalk exist before the intersection? (Yes/No);

B8—Does a crosswalk exist after the intersection? (Yes/No);

B9—Does a crosswalk exist on the left side road of the intersection? (Yes/No);

B10—Does a crosswalk exist on right side road of the intersection? (Yes/No);

B11—Does a crosswalk exist on the main road w/o intersection? (Yes/No);

B12—Does a left side road exist? (Yes/No);

B13—Does a right side road exist? (Yes/No);

B14—Does the main road end after the side roads (T-intersection)? (Yes/No);

Multi-Class Parameters/Variables:

M1—Number of lanes on the left of the ego-lane? (value) (e.g., maximum 6);

M2—Number of lanes on the right of the ego-lane? (value) (e.g., maximum 6);

Continuous Parameters/Variables:

C1—Rotation angle of the main road (e.g., when car makes a turn)? (value);

C2—Width of the right side road (when present)? (value);

C3—Width of the left side road (when present)? (value);

C4—Width of a delimiter on the main road (when present)? (value);

C5—Distance to right side street (when present)? (value);

C6—Distance to left side street (when present)? (value);

C7—Distance to crosswalk on the main road without intersections? (value);

C8—Width of delimiter between main road and sidewalk? (value);

C9—Curve radius of the main road? (value);

C10-22—Width of each lane present? (value for each (e.g., feet (', ft))).

Ego-lane or host lane are names given to the lane where the vehicle and camera are positioned.

Figure 2:
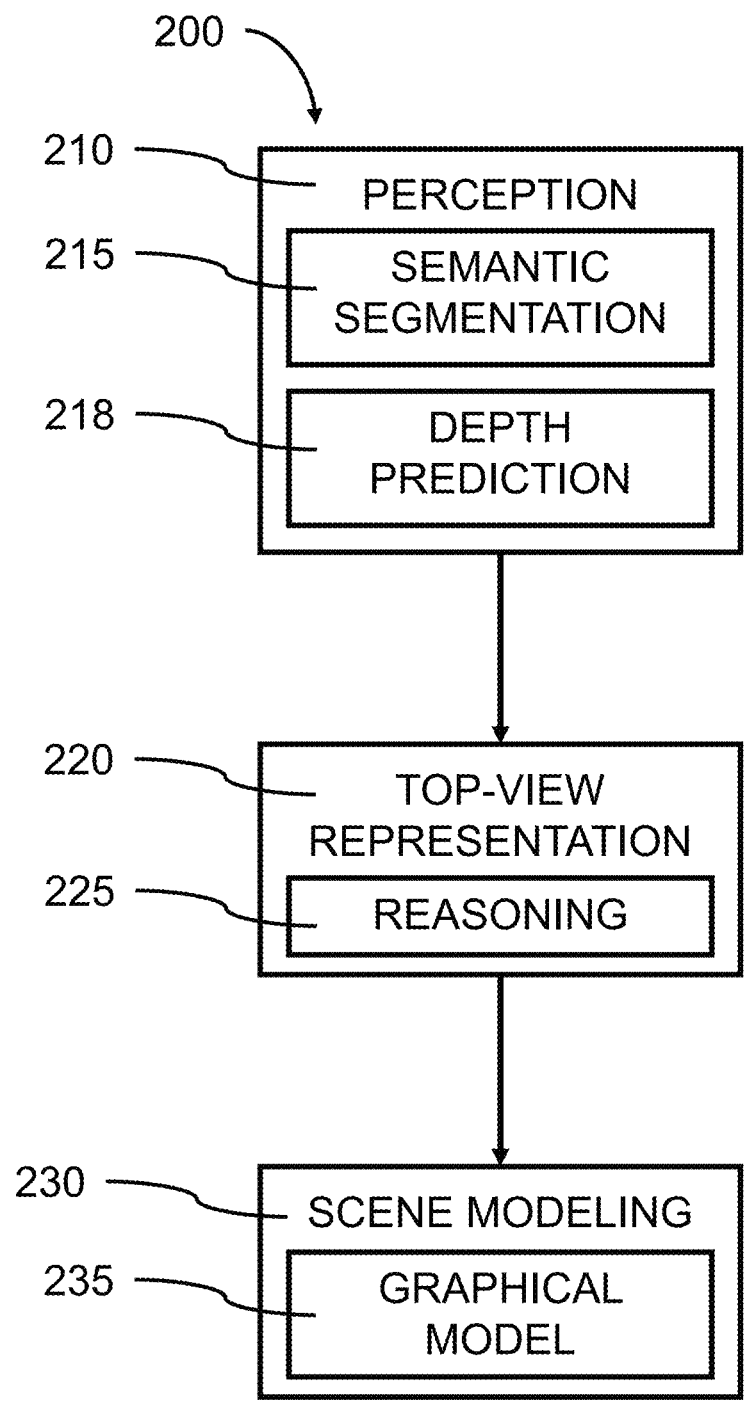
FIG. 2 is a block/flow diagram illustrating a system/method for converting a perspective image of a scene to a top view model, in accordance with an embodiment of the present invention.

FIG. 2 is a block/flow diagram illustrating a system/method for converting a perspective image of a scene to a top view model, in accordance with an embodiment of the present invention.

In one or more embodiments, a system/method 200 for converting a perspective image of a scene to a top view model is provided.

At block 210, the perception of a road scene involves capturing a perspective image using a camera (e.g., a digital video camera), where the image(s) can be made up of an array (i.e., row and column) of pixels that can be analyzed pixel by pixel. In various embodiments, a plurality of images can be captured in sequence as a video, where the images are digital images made up of row by column pixels. The digital images can be captured and recorded by a digital camera. The camera1 can be mounted forward-facing in a vehicle.

In various embodiments, given a perspective image, x, that captures a 3D scene (e.g., a roadway), a rich and interpretable scene description, which represents the scene in an occlusion-reasoned semantic top-view can be predicted. Parameters, of the model can describe various scene attributes, like the number and width of lanes, the existence of, and distance to, various types of intersections, and crosswalks and sidewalks. Explicit modeling of such parameters can be beneficial for higher-level modeling and decision making, as it provides a tangible interface to the real world that a user can use to make decisions. In various embodiments, the scene model can be fully parameterized, where the scene representation is fully described by a fixed set of parameters; and the scene model can be inferred from a single camera input with a combination of deep neural networks (DNN) and a graphical model (GM). With a fully parameterized scene model, an entire scene can be represented with a/the pre-defined attributes/parameters, such as number of lanes, whether there exist side-road and the distance to side-road, etc. Given some combinations of these parameters, one can recover the original scene.

In comparison, a partially parameterized scene model could be a road segmentation with a parameterized modeling of the lanes only, without sidewalks, crosswalks, etc. The road segmentation can be non-parametric in a sense that it is just an image with some pixels detected as the road and other pixels identified as non-road, but it is difficult to change the width of the road, when there is no parameter for "width-of-road". It would be unclear what pixels in such a segmentation would need to be modified to change the width of the road for a model. If a scene is partially parametrized, then some useful/meaningful components in the scene could be missed.

At block 215, the captured image(s) can be analyzed using a deep learning-based perception systems that can provide pixel accurate semantic segmentation, where scene parsing can provide an understanding of the captured scene, and predict a label, location, and shape for each element in an image. Semantic segmentation can be accomplished using deep neural networks (e.g., fully convolutional neural networks) to annotate each pixel in an image as belonging to a single class/object, where the semantic segmentation can be applied in/to the perspective view. With semantic segmentation, the objects in the annotated images would not overlap each other. The identified and annotated object can be shaded with a specific color to differentiate that object from other adjacent/adjoining objects. Each object in an image can be segmented by clustering the pixels into their ground truth classes. Conditional random field (CRF) can be used for post processing to refine the segmentation result.

At block 218, the location of objects within each image relative to each other can be identified using depth prediction/estimation.

In various embodiments, structure from motion (SfM) and/or multiple view stereo (MVS) can be utilized to obtain a dense 3D reconstruction of the road scene from the video sequence. The multi-view geometric constraints encoded in such methods can aggregate the temporal information from multiple frames, thus permitting a more coherent scene representation as compared to individual views. This allows a better model input to be build, which is of better representation power and smoother, which boosts the prediction accuracy as well as coherence. SfM can provide full/dense 3D reconstruction, thereby including depth.

Given a monocular video sequence capturing a road in the perspective view, a coherent yet accurate road layout estimation in the form of a top-view (i.e., top-down view, bird's-eye-view) can be obtained for each of the frames of the video, where the frames can be sequential. Scene understanding for outdoor scenarios is less constrained, and thus can be more challenging than for indoor scenes, which can have strong priors, e.g. Manhattan world assumption. Scene understanding in videos also involves consistent predictions between consecutive frames of the video.

In various embodiments, a convolutional neural network (CNN) can predict dense depth, where for each pixel in perspective image space, a depth value is provided for it. Such depth value(s) represent the predicted absolute depth of this pixel in real world, e.g. 10.5 meters from the point in the image represented by this pixel in real world to camera. The CNN can take as input a perspective image with occluded regions (corresponding to foreground objects) masked out, and estimate the segmentation labels and depth values over the entire image. The CNN can be trained without additional human annotations for occluded regions. A depth map can then be used to map the semantic segmentation of each pixel into a top-down (bird's eye) view.

The pixels far away from the camera can be unobserved due to limited image resolution or due to imperfect depth estimation. Since there is no correspondence between actual images and simulated data, an adversarial loss can be employed for teaching the neural network (e.g., convolutional neural network (CNN)) a generative aspect about road layouts.

In various embodiments, given the semantic segmentation, a mask of foreground pixels can be defined, where a pixel in the mask is 1 if and only if the segmentation at that pixel belongs to any of the foreground classes. Otherwise, the pixel in the mask is 0. In order to inform the CNN about which pixels have to be in-painted, we apply the mask on the input RGB image and define each pixel in the masked input.

At block 220, a top view representation of a road can be generated. A top-view image of the road can be generated by (1) back-projecting all the road pixels into a 3D point cloud and (2) projecting all the 3D points onto the x-y plane. This mapping can be used to transfer the semantic class probability distribution of each pixel from perspective-view into top-view (bird's eye view ("bev")), and is referred to as bev and denote as $x^r \in \mathbb{R}^{H \times W \times C}$, where C is the number of semantic classes, and in various embodiments H=128 and W=64 pixels, for example, which can relate to 60×30 meters in the point cloud in a non-limiting exemplary embodiment.

In various embodiments, given a single perspective image as input, a corresponding per-pixel semantic segmentation on background classes as well as dense depth map can be obtained. Combined with the intrinsic camera parameters, each coordinate of the perspective view can be mapped into the 3D space.

An image representation based on objects can be used for a high-level visual recognition tasks for scenes containing multiple objects. A large number of object detectors can be scanned across an image at different scales to generate a response map of an image. Existing 3D object detectors can be applied to the video frames and the detection results mapped into top-view. In various embodiments, one or more 3D detector(s) can be trained and be applied to each frame in a video sequence. Any existing 3D object/car detectors could also be applied in practice.

In various embodiments, context cues can provide useful priors and constraints for layout estimation in the top view. Traffic participants, i.e. vehicles, are commonly present in driving scenarios and can be used for layout estimation, e.g. side-faced cars are informative in terms of predicting the existence of and/or the distance to a side-road. If it is observed that some side-faced cars are X meters away, it is very likely that it is where the side-road lies. A prior probability distribution, referred to as a "prior," of an uncertain quantity is the probability distribution that would express one's beliefs about this quantity before some evidence is taken into account. Context information can be incorporated in top-view space, which is represented by object-level cues. The contextual information, such as exploiting traffic participants (cars) in top-view map are explored. In addition, the top-view images (or semantics) can include both short-range information (i.e., information from the current frame) and long-range information (i.e., cues obtained with SfM results from an entire video sequence), when a video sequence has been previously recorded (e.g., for insurance company or accident review).

In various embodiments, two decoders can be put on fused feature representation(s) for predicting semantic segmentation and the depth map of an occlusion-free scene. Given the depth map and the intrinsic camera parameters, each coordinate of the perspective view can be mapped into the 3D space. The z-coordinate (height axis) can be dropped for each 3D point, and assign x and y coordinates to the closest integer, which gives us a mapping into bird's eye view (bev) representation. Each pixel can be mapped to some geometrically meaningful top-view space. We use this mapping to transfer the class probability distribution of each pixel in the perspective view into the bird's eye view. For all points that are mapped to the same pixel in the top view, the corresponding class distribution can be averaged. Some pixels in a first occlusion-reasoned semantic representation in the bird's eye view may not be assigned any class probability, especially those far from the camera due to image foreshortening in the perspective view. Imperfect depth prediction is also an issue because it may assign a well classified pixel in the perspective view a wrong depth value, which can put the point into a wrong location in the top-view. A refinement CNN can take the first occlusion-reasoned semantic representation in the bird's eye view and predict the final occlusion-reasoned semantic representation in the bird's eye view.

In one or more embodiments, a geometrically and semantically consistent spatial layout can be estimated even in regions hidden behind foreground objects, like cars or pedestrians, without requiring human annotation for occluded pixels or the top-view itself.

In various embodiments, given simulated data with accurate and complete annotations, as well as real images with potentially noisy and incomplete annotations, a hybrid training procedure leveraging both sources of information can be utilized. A scene model allows efficient sampling and enables the generation of large-scale simulated data with accurate and complete annotations.

At block 225, occlusion reasoning can be applied when the input is an entire sequence of video frames, the artifacts and occlusions in an individual frame can be addressed by generating a more complete 3D reconstruction as well as the subsequent bev from sequential video frames. SfM and MVS algorithms, for example, from COLMAP, as well as semantic segmentation in the 2D image can be used to generate the top-view map (denoted as bev-col) from the video frames. A simple winner-take-all strategy can be applied to determine the final semantic label for each point. The 3D semantic segmentation allows the 3D points for the road part to be extracted, to which a 2D plane can be fitted. The bev-col (in reference to bev maps generated by COLMAP algorithms) can be generated by cropping a rectangular box on the 2D road plane according to the camera pose and our pre-defined top-view image size and resolution; 3D points on the plane are converted into the pixels in the image.

A sideroad that is far away or occluded can be difficult to noticed in a bev generated from an individual video frame, due to the lack of observations in perspective view. In contrast, bev-col generated with global information (e.g., sequential frames) is able to recover the sideroad properly as long as there are observations in subsequent frame of the video of the previously occluded area. Local (e.g., single frame) and global (e.g., multiple frame) cues can be mutually informative. The bev-col can be overlayed on top of bev to fuse them together.

In various embodiments, the camera position can be used to transform the global plane parameters to the local parameters with respect to the camera.

At block 230, a scene model can be formulated.

At block 235, a graphical model for predicting consistent layouts of road scenes can be generated and trained.

In various embodiments, the elements of scene attributes and corresponding predictions can be denoted as: $\Theta[\bullet]$ and $\eta[\bullet]$, respectively, where indices $i \in \{1, \ldots, M^b\}$, $p \in \{1, \ldots, M^m\}$ and $m \in \{1, \ldots, M^c\}$ can be used for binary, multi-class, and continuous variables, respectively.

The scene understanding can be formulated as an energy minimization problem:

$$E(\Theta|x) = E_b(\Theta_b) + E_m(\Theta_m) + E_c(\Theta_c) + E_s(\Theta_b, \Theta_m) + E_q(\Theta_b, \Theta_c) + E_h(\Theta_b, \Theta_m, \Theta_c),$$

where each $E(*)$ denotes energy potentials for the associated scene attribute variables ($\Theta_b$, $\Theta_m$ and $\Theta_c$) ("*" is a wildcard/placeholder, "b" represents binary, "m" represents multi-valued variables, "c" represents continuous variables). The details for each of the potentials is described in the following. For binary variables $\Theta_b$, the potential function $E_b$ can consist of two terms:

$$E_b(\Theta_b) = \Sigma_i \phi_b(\Theta_b[i]) + \Sigma_{i \sim j} \psi_b(\Theta_b[i], \Theta_b[j]).$$

The unary term $\varphi_b(*)$ specifies the cost of assigning a label to $\Theta_b^i$ and is defined as $-\log P_b(\Theta_b[i])$, where $P_b(\Theta_b[i]) = \eta_b[i]$ is the probabilistic output of the neural network h. The pairwise term $\psi_b(\bullet, \bullet)$ defines the cost of assigning $\Theta_b[i]$ and $\Theta_b[j]$ to i-th and j-th variable as $\psi_b(\Theta_b[i], \Theta_b[j]) = -\log M_b(\Theta_b[i], \Theta_b[j])$, where $M_b$ is the co-occurrence matrix and $M_b(\Theta_b[i], \Theta_b[j])$ is the corresponding probability. i and j can be indexes over the attributes/labels/variables. For multi-class variables, the potential is defined as $E_m(\Theta_m) = P_p \varphi_m(\Theta_m[p])$, where $\varphi_m(\bullet) = -\log P_m(\bullet)$ and $P_m(\Theta_m[p]) = \eta_m[p]$. Similarly, the potential for continuous variables is defined as: $E_c(\Theta_c) = P_m \varphi_c(\Theta_c[m])$ with $\varphi_c(\Theta_c[m])$ being the negative log-likelihood of $\eta_c[m]$. $\eta[\bullet]$ represents corresponding predictions, and $m \in \{1, \ldots, M^c\}$ is an index.

For a coherent prediction, we further introduce the potentials $E_s$, $E_q$ and $E_h$ to model correlations among scene attributes. $E_s$ and $E_q$ enforce hard constraints between certain binary variables and multi-class or continuous variables, respectively. They convey the idea that, for instance, the number of lanes of a side-road is consistent with the actual existence of that side-road. The set of pre-defined pairs between $\Theta_b$ and $\Theta_m$ is denoted as: $S = \{(i, p)\}$ and between $\Theta_b$ and $\Theta_c$ as $Q = \{(i, m)\}$. Potential $E_s$ is then defined as:

$$E_s(\Theta_b, \Theta_m) = \Sigma_{i,p \in S} \infty \times \mathbb{1}(\Theta_b[i] \neq \Theta_m[p])$$

where $\mathbb{1}[*]$ is the indicator function. Potential $E_q$ is defined likewise but using the set Q and variables $\Theta_c$. In both cases, a high penalty can be applied to scenarios where two types of predictions are inconsistent. The potential $E_h$ of the energy models higher-order relations between $\Theta_b$, $\Theta_m$ and $\Theta_c$. The potential takes the form:

$$E_h(\Theta_b, \Theta_m, \Theta_c) = \Sigma_{c \in C} \infty \times f_c(\Theta_b[i], \Theta_m[p], \Theta_c[m]),$$

where c=(i, p, m) and $f_c(\cdot, \cdot, \cdot)$ is a table where conflicting predictions are set to 1. C represents the relations between scene attributes and the constraints enforce on them. The energy function can be extended by two terms that enforce temporal consistency of the binary and multi-class variables and smoothness for continuous variables.

Figure 3:
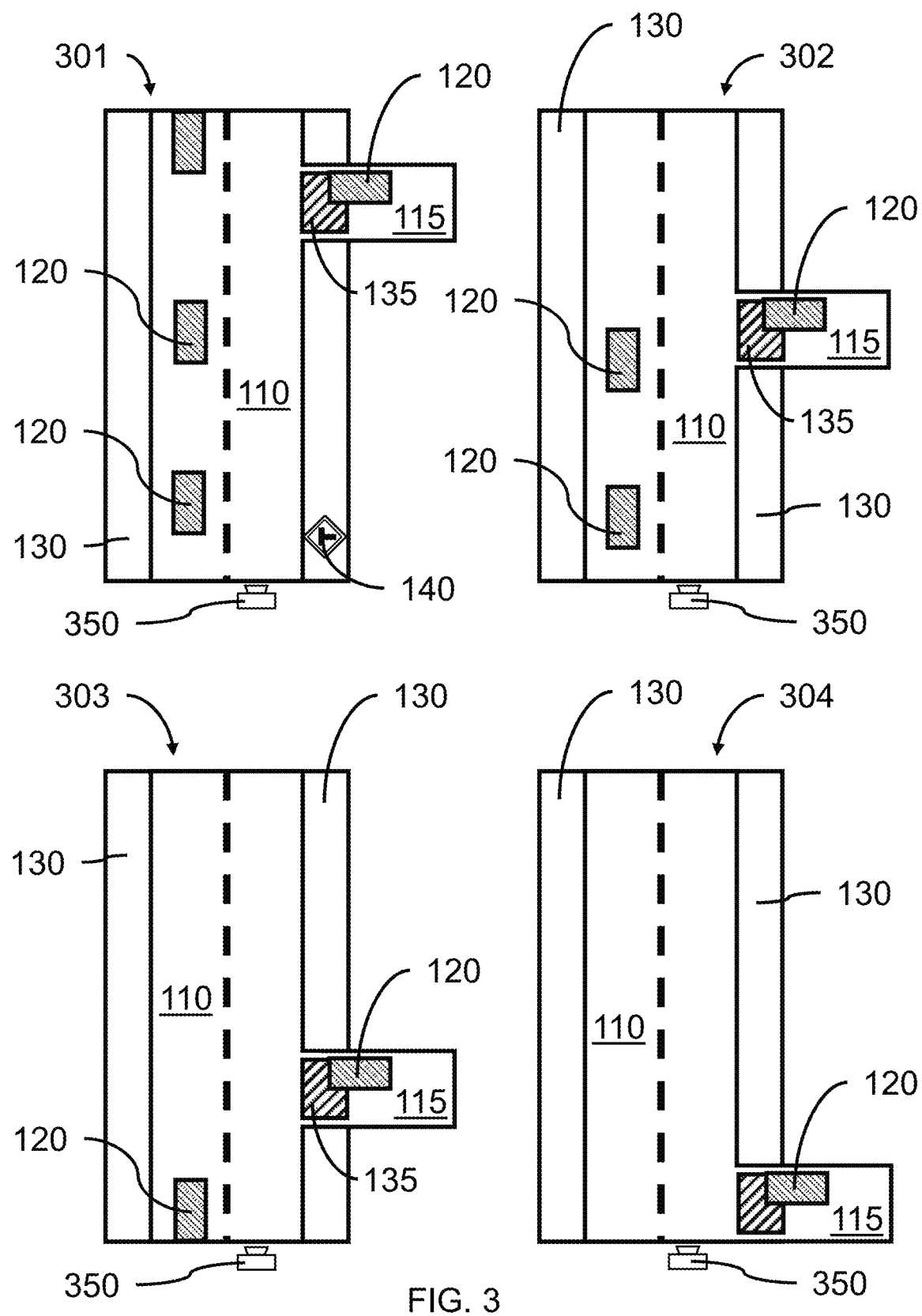
FIG. 3 is an estimation and rendition of the roadway illustrated in FIG. 1 showing features captured from the perspective road view in a top-down view, in accordance with an embodiment of the present invention.

FIG. 3 is an estimation and rendition of the roadway illustrated in FIG. 1 showing features captured from the perspective road view in a top-down view, in accordance with an embodiment of the present invention.

In various embodiments, vehicles 120 on the roadway 110 can be identified, for example, using a neural network pattern or image recognition approach. Placement and motion of the vehicles 120 can be used to identify drivable areas. For example, by looking at only the cross-hatched rectangles representing vehicles 120 in the "top-view representation" in FIG. 3, one can obtain a rough estimate of the drivable areas based on the vehicles relative positioning and orientation relative to the camera. The relative positioning and orientation can be monitored over subsequent images.

In various embodiments, the sequence of perspective images 101, 102, 103, 104 can be translated into top view images 301, 302, 303, and 304, respectively. The relative motion of the camera 350 to the other vehicles 120 can be utilized by aggregating information to achieve consistency on the feature level. By explicitly and implicitly encoding temporal smoothness constraints, the neural network can improve the prediction accuracy and consistency. Structure from motion (SfM) and multiple view stereo (MVS) can be used to obtain a dense 3D reconstruction of the road scene from the video sequence.

Context information is incorporated by introducing road participants, e.g. objects, into the model.

Figure 4:
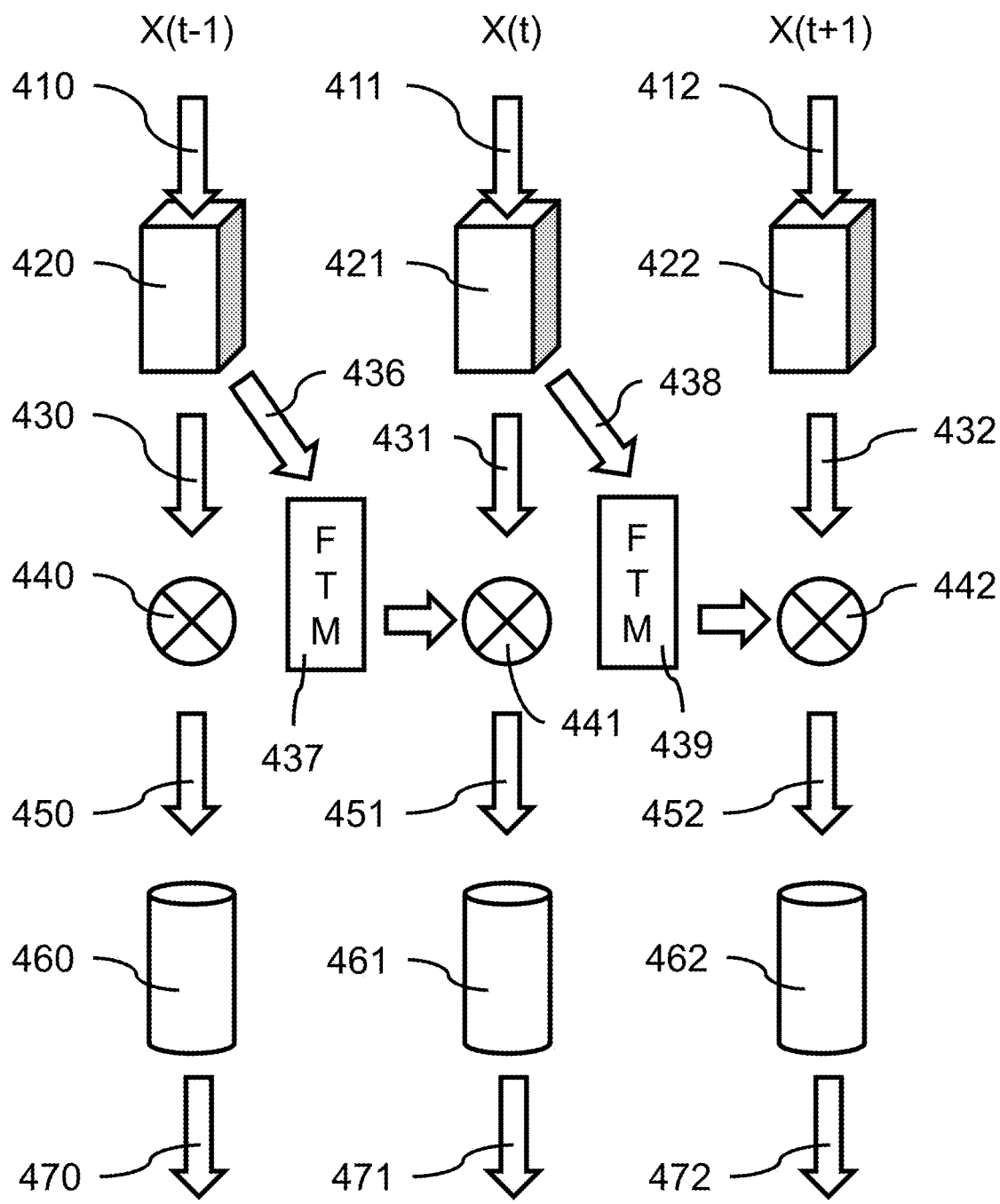
FIG. 4 is a flow diagram illustrating a system/method for modeling and predicting the layout of a driving scene as a top-down view (bird's eye view), in accordance with an embodiment of the present invention.

FIG. 4 is a flow diagram illustrating a system/method for modeling and predicting the layout of a driving scene as a top-down view (bird's eye view), in accordance with an embodiment of the present invention.

In one or more embodiments, a neural network can be trained and utilized to directly predict road features from single perspective RGB image(s), and from sequential RGB images from a video. In various embodiments, the neural network design can include (i) a feature extractor to leverage information from both domains, simulated and real semantic top-views from, and (ii) a domain-agnostic classifier of scene parameters.

In various embodiments, a training procedure can use supervised domain adaptation techniques to incorporate both simulated as well as manually annotated data.

In various embodiments, a Conditional Random Field (CRF) can enforce coherent predictions for a single frame and encourages temporal smoothness among video frames, where a CRF is a type of graphical model (GM).

In various embodiments, the representation of the road scene at a certain view can be a single perspective image denoted as $x \in \mathbb{R}^{H \times W \times C}$. The input image can be a picture taken by a camera (e.g., video camera). The image can have a width, W, and a height, H, in pixels, for example, 1024 pixels×768 pixels for an Extended Graphics Array (XGA). A color image can also have a third dimension for channels, C, for example, of size 3 for RGB (red, green, blue).

In a non-limiting exemplary embodiment, a neural network could process such an input image, x, and produce a feature map of size 1024/16×768/16×C=64×48×C. So the neural network could downscale the input image, and could change the size of the third dimension. Instead of the colors RGB, the neural network could provide its own representation for each pixel having a vector of length C.

In various embodiments, the whole pipeline can convert a perspective input image into a top-view representation, where the meaning of H and W changes, but is still essentially the size of an image. For example, in a satellite image, the width and height of the image corresponds to distances (e.g., lengths) in actual meters, e.g., the satellite image covers an area 30 meters wide and 60 meters long. For a first representation after the conversion to a top-view, C, can equal the number of semantic categories, and this input data can then be processed by a neural network.

A video image, x, in a sequence of T images, can be denoted, $x^t$, for the t-th frame/image in the video sequence. Here, x can be regarded as any generic representation, such as a Red-Green-Blue (RGB) perspective image. x can also be considered a spatial map using the pixels of the image. A top-view image of the road for a single frame can be denoted as $x^r$. A data set, $\mathcal{D}^r = \{x^r, \Theta^r\}_{i=1}^{N^r}$, for $N^r$ samples of semantic top-views, $x^r$, and corresponding scene attributes, $\Theta^r$, can be identified.

In various embodiments, a data set, $\mathcal{D}^s = \{x^s, \Theta^s\}_{i=1}^{N^s}$, for $N^s$ samples of simulated semantic top-views, $x^s$, and corresponding simulated scene attributes, $\Theta^s$, can be generated.

The semantic top-views $x^r \in \mathbb{R}^{H \times W \times C}$, with spatial dimensions H×W, contain C semantic categories (e.g., "road", "sidewalk", "lane boundaries", "crosswalks", etc.) and are computed by applying a framework.

Given $x^t$, the overall model is defined as follows:

$$y^t = f_{com}(g_i(x^t), g_{ftm}(g_i(x^{t-1}))), \Theta^t = h(g_{lstm}(g_j(y^t))),$$

where $y^t$ is the auxiliary intermediate feature representation, $f_{com}$ is a neural network for a composition of frames, $g_i$ is a feature transform that converts $x^*$ to features $g_i(x^*)$ (where '*' is a place holder for the time index), $g_{ftm}$ is a feature transform (module) that converts $g_i(x^*)$ into features, $g_{ftm}(g_i(x^{t-1}))$. The output of $g_j$ is a 1-dimensional feature vector (for each frame) that is further fed into an LSTM module $g_{lstm}$. $g_{lstm}$ then outputs features that implicitly encode information from the previous frame by incorporating hidden states from $x^{t-1}$ and sends it/them to h. Then, the function h is defined as a multi-layer perceptron (MLP) predicting the scene attributes $\Theta^t$ with features obtained from LSTM module. Specifically, h is implemented as a multi-task network with three separate predictions for each of the parameter groups of the scene model The model can be defined as a directed acyclic graph enabling efficient sampling and is represented in the top-view, to make rendering easy. h, g* and f* are neural networks, with weights $\gamma_h$, $\gamma_{g*}$ and $\gamma_{f*}$ respectively, that are to be trained. "$f_{com}$" (i.e., f_{com}) can be a weighted combination function that combines the features from a current frame with the previous transformed features, with the applied weights.

At input stages 410, 411, and 412, a sequential set of images (e.g., video frames) can be input to a neural network, $g_i$, where the sequential set of images can include images at times, t−1, t, and t+1. The images at sequential times can be represented as $x^{t-1}$, $x^t$, $x^{t+1}$, as shown in the equations, or x(t−1), x(t), x(t+1), as shown in FIG. 4. The time reference does not have to start with the beginning (i.e., first frame) of the video sequence, that is video image $x^{t-1}$ does not necessarily correlate with the first image of the captured video.

In various embodiments, neural network, $g_i$, is represented as boxes 420, 421, and 422, where the neural network 420, 421, and 422, performs a feature extraction on images x(t−1), x(t), x(t+1) at times t−1, t, and t+1, to generate feature transforms, $g_i(x^{t-1})$, $g_i(x^t)$, $g_i(x^{t+1})$, etc. In various embodiments, the architecture of $g_i$ can be a shallow (one-layer) convolutional neural network (CNN).

In various embodiments, a feature map $F=g_i(x^*)\in R^{h_f \times w_f \times c_f}$, where $h_f$, $w_f$, and $c_f$ denote the height, width and feature dimension that can be extracted after $g_i$.

At 430, the feature transform, $g_i(x^{t-1})$, output by neural network 420 is conveyed and input into a combiner 440 that combines the vector or tensor of the feature transform, $g_i(x^{t-1})$ 430 with a vector/tensor of a previous feature transform. In various embodiments, for each image from t and t−1, the images can be parsed individually to $g_i$, which generates $g_i(x^t)$ and $g_i(x^{t-1})$. Then the output feature from the previous frame can be parsed to the feature transform module (FTM), which generates $g_{ftm}(g_i(x^{t-1}))$. Then both $g_{ftm}(g_i(x^{t-1}))$ and $g_i(x^t)$ can be inputted into $f_{com}$ to output a final feature, which can then be processed and subsequently the feature inputted into an LSTM module.

At 436, the feature transform, $g_i(x^{t-1})$, is transferred and input into a feature transform module, $g_{ftm}$, 437 that finds a correspondence between two feature maps in neighboring frames. A way to achieve this is by computing optical flow between neighboring perspective images and transforming the correspondence with regard to the flow field on the feature map. Another way to achieve this is to warp the feature map, $g_i(x^{t-1})$ 430, at time step t−1 to the current time step t, which can then be inputted into feature transform module, $g_{ftm}$, 437. Given the correspondence between feature maps, the feature map can be warped at time step t−1 to the current time step t, denoted as:

$$g_{ftm}(F^{t-1})=\varphi(F^{t-1}, S^{t-1}(x^t, x^{t-1})),$$

where $\varphi(*)$ is the bilinear sampling function and $S^{t-1}(x^t, x^{t-1})\in R^{h_f \times w_f \times 2}$ is a displacement (or flow) field between frames t and t−1. $F^{t-1}$ is a feature map for t−1 generated by $g_i(x^{t-1})$.

At 437, the feature transform module, $g_{ftm}$, 437 operates on the feature transform, $g_i(x^{t-1})$ 430, to output a feature map $g_{ftm}(F^{t-1})$.

In various embodiments, a Feature Transform Module (FTM) can warp the feature in top-view and effectively aggregate information over time. Such module is able to explicitly encourage temporal smoothness in predictions by enforcing feature-level consistency over frames. Although road layout is static, the camera is moving. So the feature map $F^t$ obtained at time step t and feature map $F^{t-1}$ are generally different at some the same location. Intuitively, if one can find the dense correspondences between feature maps from consecutive frames, it is possible to aggregate information among frames thus to encourage the feature level consistency.

$$f_{st}(F^{t-1})=f_{st}(g_i(x^{t-1}))=\varphi(F^{t-1}, S^{t-1}(x^t, x^{t-1})),$$

where $\varphi(*)$ is the bilinear sampling function and $S^{t-1}(x^t, x^{t-1})\in R^{h_f \times w_f \times 2}$ is a displacement (or flow) field between frames t and t−1.

At 431, the feature transform, $g_i(x^t)$, generated at 421 is conveyed and input into a feature combiner 441 with the output of feature transform module, $g_{ftm}(g_i(x^{t-1}))$ output from the feature transform module 437.

At 441, the output of feature transform module, $g_{ftm}$, 437 can be combined with the output of feature transform, $g_i(x^t)$, generated at 421. One can choose various ways to aggregate the feature map $g_{ftm}(F^{t-1})$ and $F^t$. In various embodiments, a simple weighted summation of the two can be adopted.

$$f_{com}(F^t, g_{ftm}(F^{t-1}))=\alpha \cdot F^t + (1-\alpha) \cdot g_{ftm}(F^{t-1}),$$

where $\alpha$ can either be a scalar, e.g. $\alpha=\frac{1}{2}$, or a matrix, $\alpha \in R^{h_f \times w_f}$. Note that in both cases, $\alpha$ can be automatically learned together with the rest of the network without any additional supervision. For special cases where t=1, $g_{ftm}(F^{t-1})$ can be assumed to be equal to $F^t$.

In various embodiments, two sequential images, for example, at time, t, and time t+1, the information from t−1 to t can be aggregated, which provides more temporally coherent features and predictions.

At 438, the feature transform, $g_i(x^t)$, is transferred and input into a feature transform module, $g_{ftm}$, 439 that finds a correspondence between two feature maps in neighboring frames. A way to achieve this is by computing optical flow between neighboring perspective images and transforming the correspondence with regard to the flow field on the feature map. Another way to achieve this is to warp the feature map, $g_i(x^{t-1})$ 430, at time step t−1 to the current time step t. Given the correspondence between feature maps, the feature map can be warped at time step t−1 to the current time step t, denoted as:

$$g_{ftm}(F^t)=\varphi(F^t, S^t(x^t, x^t)),$$

where $\varphi(*)$ is the bilinear sampling function and $S^t(x^t, x^t)\in R^{h_f \times w_f \times 2}$ is a displacement (or flow) field between frames t+1 and t.

At 439, the feature transform module, $g_{ftm}$, 437 operates on the feature transform, $g_i(x^t)$ to output a feature map $g_{ftm}(F^t)$.

At 432, the feature transform, $g_i(x^{t+1})$, generated at 422 is conveyed and input into a feature combiner 442 with the output of feature transform module, $g_{ftm}(g_i(x^t))$ output from the feature transform module 439.

At 442, the output of feature transform module, $g_{ftm}$, 439 can be combined with the output of feature transform, $g_i(x^{t+1})$, generated at 422. One can choose various ways to aggregate the feature map $g_{ftm}(F^{t+1})$ and $F^t$. In various embodiments, a simple weighted summation of the two can be adopted.

$$f_{com}(F^{t+1}, g_{ftm}(F^t))=\alpha \cdot F^{t+1} + (1-\alpha) \cdot g_{ftm}(F^t),$$

where $\alpha$ can either be a scalar, e.g. $\alpha=\frac{1}{2}$, or a matrix, $\alpha \in R^{h_f \times w_f}$. Note that in both cases, $\alpha$ can be automatically learned together with the rest of the network without any additional supervision.

In various embodiments, two sequential images, for example, at time, t, and time t+1, can be aggregated, which provides more temporally coherent features and predictions.

At 450, the combined output from combiner 440 can be input into long short-term memory (LSTM) module 460, $g_{lstm}$, to exploit long-term temporal information.

At 470, $g_{lstm}$, then outputs features that implicitly encode information from a previous frame by incorporating hidden states from $x^{t-1}$ and sends it/them to h. In various embodiments, the function h is defined as a multi-layer perceptron (MLP) predicting the scene attributes $\Theta$ given $f_x$, where h can be implemented as a multi-task network.

At 451, the combined output from combiner 441 can be transferred and input into long short-term memory (LSTM) module 461, $g_{lstm}$, to exploit long-term temporal information.

At 471, $g_{lstm}$, then outputs features that implicitly encode information from previous frame by incorporating hidden states from $x^{t-1}$ and sends it/them to h.

At 452, the combined output from combiner 442 can be input into long short-term memory (LSTM) module 462, $g_{lstm}$, to exploit long-term temporal information.

At 472, $g_{lstm}$, then outputs features that implicitly encode information from previous frame by incorporating hidden states from $x^{t-1}$ and send to h.

In various embodiments, to leverage both sources of supervision (real and simulated data) during training, we define this mapping as $\Theta=f(x)=(h \circ g)(x)$, where $\circ$ defines a function composition and h and g are neural networks, with weights $\gamma_h$ and $\gamma_g$ respectively, that we want to train. The circle "$\circ$" is the symbol for composition of functions, where the output of one function is used as the input of the subsequent function.

In various embodiments, g is a 6-layer convolutional neural network (CNN) that converts a semantic top-view $x \in \mathbb{R}^{H \times W \times C}$, into a 1-dimensional feature vector $f_x \in \mathbb{R}^D$, where D is the dimensionality of the feature $f_x$. In various embodiments, the function h is defined as a multi-layer perceptron (MLP) predicting the scene attributes $\Theta$ given $f_x$. Specifically, h is implemented as a multi-task network with three separate predictions $\eta_b$, $\eta_m$ and $\eta_c$ for each of the parameter groups $\Theta_b$, $\Theta_m$ and $\Theta_c$ of the scene model.

A neural network can take, as input, data of some dimensionality D1 and output features of dimensionality D2. These dimensions are hyper-parameters, except for the input dimension, which is dictated by the input data itself.

A supervised loss functions on real (and simulated) data and leverage domain adaptation techniques is utilized to minimize the domain gap between the output of g given top-views from different domains. g can map semantic top-views, x, of different domains into a common feature representation, usable by a domain-agnostic classifier h.

Given data sets $D^r$ of real data that includes $N^r$ videos, a loss function is defined:

$$\mathcal{L}_{sup}^{(t)} = \Sigma_{i,t}^{N^r,T} BCE(\Theta_{b,i}^t, \eta_{b,i}^t) + CE(\Theta_{m,i}^t, \eta_{m,i}^t) + \ell_1(\Theta_{c,i}^t, \eta_{c,i}^t)$$

where (B)CE is the (binary) cross-entropy loss and we denote the t-th frame in i-th video sequence in the data set as $\{\Theta^t, \eta^t\}_{t,i}$, and where b is binary, m is multivalued, and c is class or category. "$\ell_1$" is the distance between two variables, and "$\eta_{c,i}^t$" is the corresponding predictions for the i-th continuous variables at time step tScene attributes without manual annotation can be ignored for $\mathcal{L}_{sup}^{\{t\}}$. Continuous variables can be discretize. In various embodiments, each variable is discretized into K bins by convolving a dirac delta function centered at $\Theta_c$ with a Gaussian of fixed variance.

The loss function can be used to compare the predictions of the scene attributes/parameters (theta—output of network h) with the ground truth (referring to information provided by direct observation (i.e. empirical evidence)). We have a data set of many pairs (input images and corresponding scene attributes/parameters). The loss function returns a single scalar that corresponds to how much error out neural network makes. This error/loss should be minimized (via gradient-based optimization here). This is standard supervised learning for neural networks. The loss, as described above, is split into three parts, one for each of the different types of scene parameters: binary, multi-class and continuous.

In a non-limiting exemplary embodiment, the architecture of $g_i$ is a shallow (one-layer) convolutional neural network (CNN) and $g_j$ is a deeper (seven-layer) network work.

In various embodiments, the individual input(s) $x^t$ are passed to $g_i$ and receive feature $g_i(x^t)$. Then this feature is combined with $g_{ftm}(g_i(x^{t-1}))$, which is obtained by feeding $g_i(x^{t-1})$, the feature obtained from previous frame, to FTM $g_{ftm}$, and feed to $g_j$. The output of $g_j$ is a 1-dimensional feature vector (for each frame) that is further fed into an LSTM module $g_{lstm}$. $g_{lstm}$ then outputs features that implicitly encode information from the previous frame by incorporating hidden states from $x^{t-1}$ and sends it/them to h. Then, the function h is defined as a multi-layer perceptron (MLP) predicting the scene attributes $\Theta^t$ with features obtained from LSTM module. Specifically, h is implemented as a multi-task network with three separate predictions for each of the parameter groups of the scene model.

In various embodiments, a model can be formulated by aggregating features from frames that are further away than the next sequential frame or even from future frames in offline settings.

In various embodiments, a model that takes a video sequence as input and outputs accurate while consistent per-frame predictions can be designed.

In various embodiments, two public driving data sets, KITTI and NuScenes can be used to validate the models. The results demonstrate the effectiveness of the global and context cues in terms of prediction accuracy, and the importance of the LSTM as well as FTM for consistent outputs.

Figure 5:
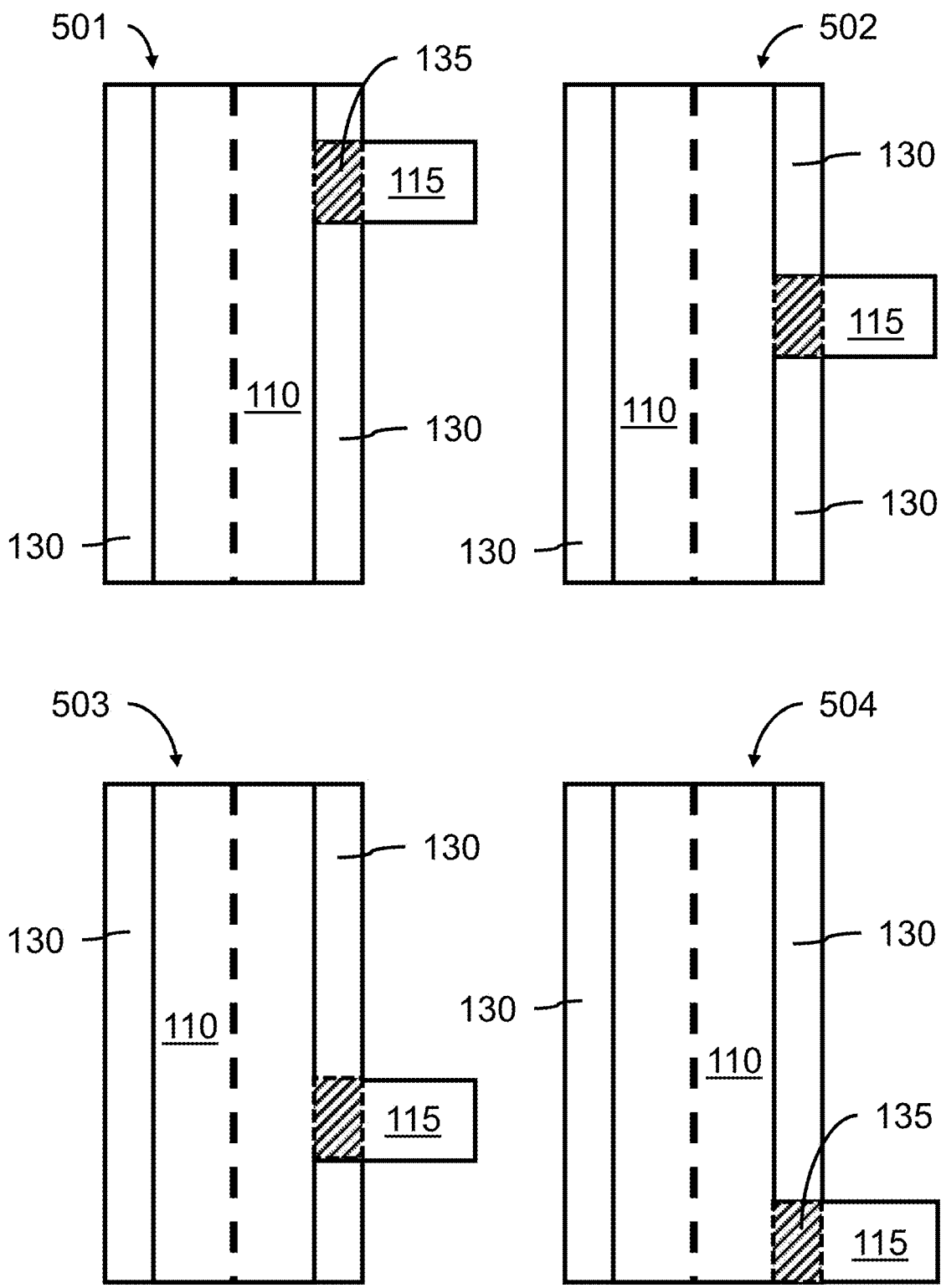
FIG. 5 is a diagram illustrating a final prediction of a modeled road in a top-down view, in accordance with an embodiment of the present invention.

FIG. 5 is a diagram illustrating a final prediction of a modeled road in a top-down view, in accordance with an embodiment of the present invention.

Individual image models 501, 502, 503, 504, show the parameters generated by the graphical model. The image models 501, 502, 503, 504, show a two lane road 110 with a side street 115 having a sidewalk 130 and crosswalk 135 for each of a sequential set of input images.

While the FTM can be configured to utilize two consecutive frames (enabling an online system), it can be extended by aggregating features from multiple frames that are further away or even from future frames in offline settings.

The output model can be displayed to a user on a screen to allow the user to detect immediate upcoming hazards, make travel decisions, and adjust their driving style to adapt to the road conditions on a real time basis. Insurance companies and accident investigators can use a captured video to recreate a top view of an accident for evaluation and determination of fault.

Figure 6:
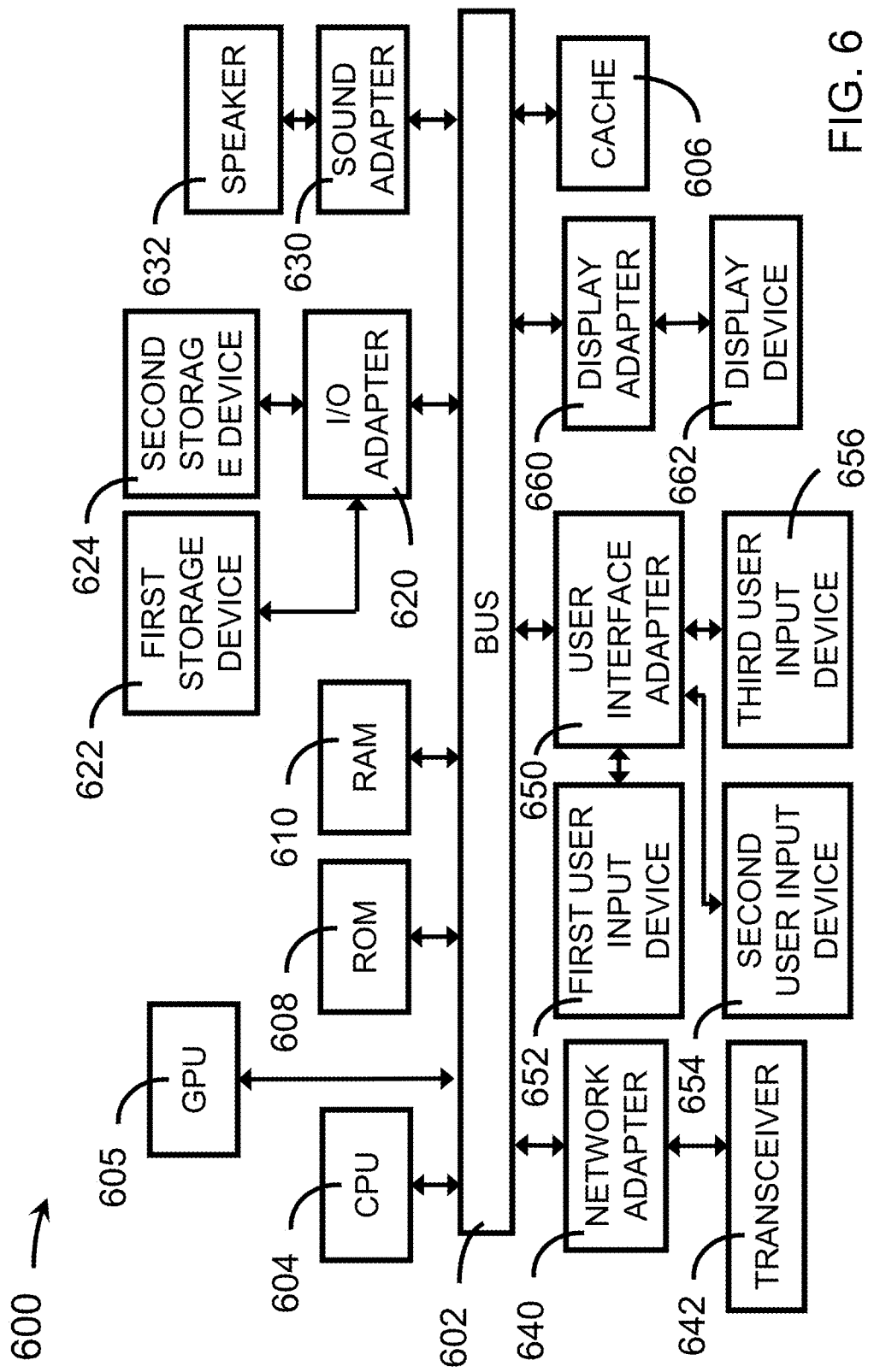
FIG. 6 is an exemplary processing system 600 to which the present methods and systems may be applied, in accordance with an embodiment of the present invention.

FIG. 6 is an exemplary processing system 600 to which the present methods and systems may be applied, in accordance with an embodiment of the present invention.

The processing system 600 can include at least one processor (CPU) 604 and may have a graphics processing (GPU) 605 that can perform vector calculations/manipulations operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state device, a magnetic storage device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a system for implementing respective embodiments of the present methods/systems. Part or all of processing system 800 may be implemented in one or more of the elements of FIGS. 1-5. Further, it is to be appreciated that processing system 600 may perform at least part of the methods described herein including, for example, at least part of the method of FIGS. 1-5.

Figure 7:
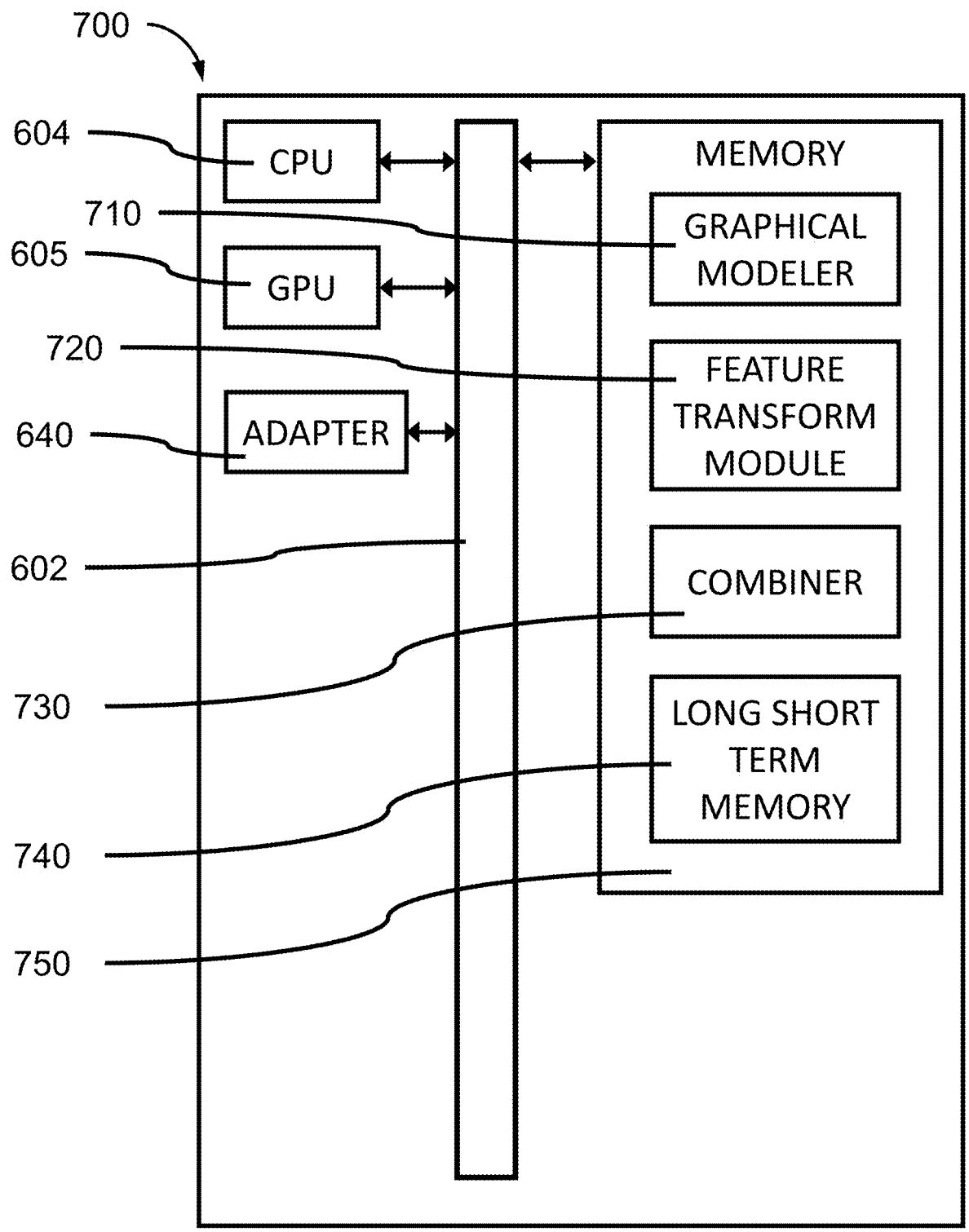
FIG. 7 is an exemplary processing system 700 configured to implement a multi-stage decision tree, in accordance with an embodiment of the present invention.

FIG. 7 is an exemplary processing system 700 configured to implement one or more neural networks for modeling road layouts, in accordance with an embodiment of the present invention.

In one or more embodiments, the processing system 700 can be a computer system 600 configured to perform a computer implemented method of identifying viable business entities.

In one or more embodiments, the processing system 700 can be a computer system 600 having memory components 750, including, but not limited to, the computer system's random access memory (RAM) 610, hard drives 622, and/or cloud storage to store and implement a computer implemented method of understanding road layouts from video images. The memory components 750 can also utilize a database for organizing the memory storage.

In various embodiments, the memory components 750 can include a graphical modeler 710 that can be configured to implement a plurality of neural networks configured to model a road layout, that can implement a Feature Transform Module (FTM), and can implement a Long Short Term Memory. The graphical modeler 710 can also be configured to receive as input digital images of perspective views of a road and transform the perspective view to top-down (i.e., bird's eye) views. The input can be a sequential set of video images. The graphical modeler 710 can also be a deep learning-based perception systems that can provide pixel accurate semantic segmentation In various embodiments, the memory components 750 can include a feature transform module 720 configured to extract a feature map, where the feature map at time step t−1 can be warped to the current time step t.

In various embodiments, the memory components 750 can include a Combiner 730 configured to aggregate the feature map $g_{ftm}(F^{t-1})$ and $F^t$. The Combiner 730 can be configured to receive two or more feature maps and perform a weighted summation of the two or more feature maps.

In various embodiments, the memory components 750 can include a Long Short Term Memory 740 configured to output features that implicitly encode information from previous frame(s) by incorporating hidden states from $x^{t-1}$ and sends the output to a multi-layer perceptron (MLP) predicting the scene attributes $\Theta^t$ with features obtained from LSTM module. The output can be displayed on a screen for viewing and implementation by the user.

Figure 8:
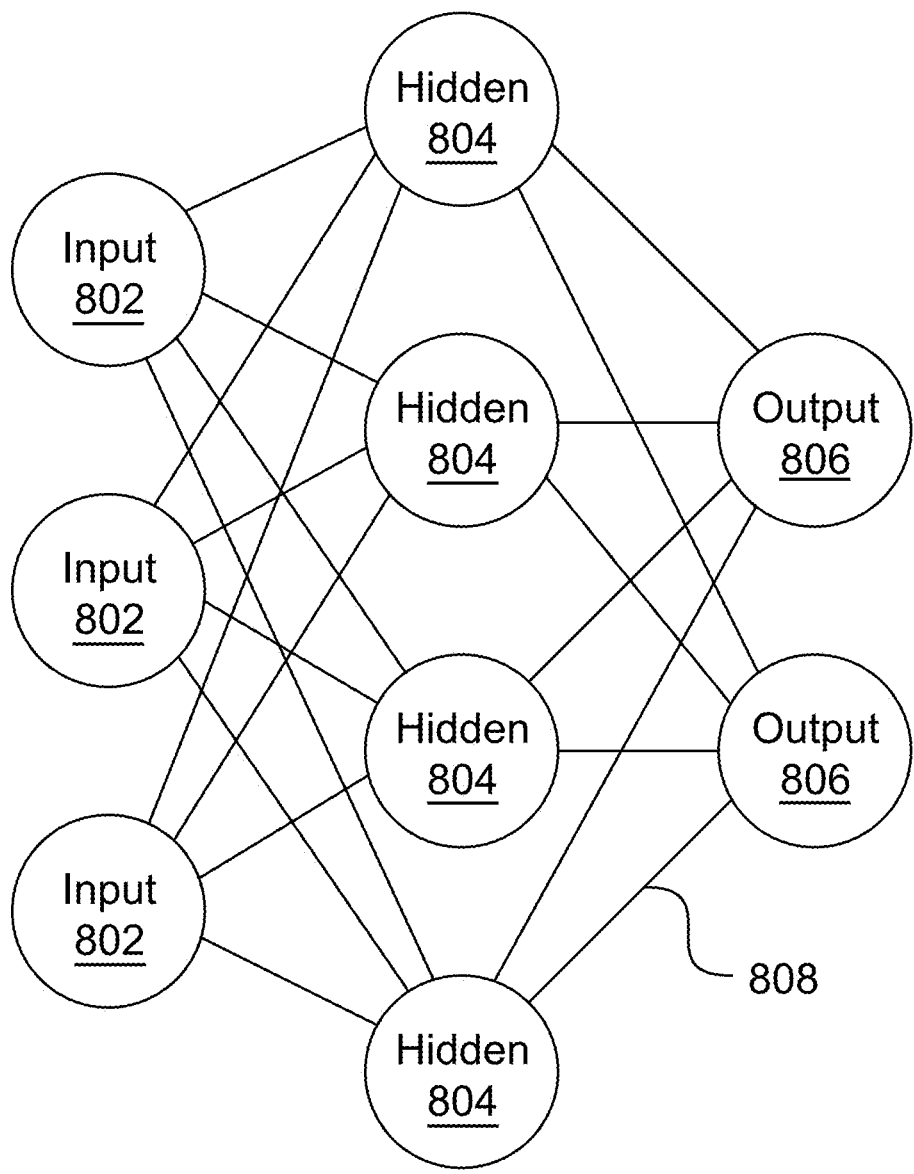
FIG. 8 is a block diagram illustratively depicting an exemplary neural network in accordance with another embodiment of the present invention.

FIG. 8 is a block diagram illustratively depicting an exemplary neural network in accordance with another embodiment of the present invention.

A neural network 800 may include a plurality of neurons/nodes 801, and the nodes 808 may communicate using one or more of a plurality of connections 808. The neural network 800 may include a plurality of layers, including, for example, one or more input layers 802, one or more hidden layers 804, and one or more output layers 806. In one embodiment, nodes 801 at each layer may be employed to apply any function (e.g., input program, input data, etc.) to any previous layer to produce output, and the hidden layer 804 may be employed to transform inputs from the input layer (or any other layer) into output for nodes 801 at different levels.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for producing a road layout model, comprising:
    capturing a plurality of sequential digital images using a video camera, wherein the digital images are of a perspective view;
    converting each of the plurality of sequential digital images into a top-down view image using a processor through semantic segmentation, wherein each object in the sequential digital images is segmented by clustering pixels of the object into ground truth classes, and assigning a depth value to each pixel;
    conveying a top-down view image of time t to a neural network that performs a feature transform on the top-down view image of time t to form a feature map of time t;
    transferring the feature map of the top-down view image of time t to a feature transform module configured to warp the feature map of time t to a time t+1;
    conveying a top-down view image of time t+1 to the neural network that performs a feature transform on the top-down view image of time t+1 to form a feature map of time t+1;
    combining the warped feature map of time t with the feature map of time t+1 to form a combined feature map;
    transferring the combined feature map to a long short-term memory (LSTM) module to generate the road layout model; and
    displaying the road layout model to a user.

2. The method as recited in claim 1, wherein the road layout model is displayed to a user in a vehicle to make driving decisions in real time.

3. The method as recited in claim 1, wherein the feature maps are combined using a simple weighted summation, $f_{com}(F^t, g_{ftm}(F^{t-1}))=\alpha \cdot F^t+(1-\alpha) \cdot g_{ftm}(F^{t-1})$, wherein $f_{com}$ represents a combined feature map, $F^t$ is the feature map of time t, $F^{t-1}$ is the feature map of time t−1, and $g_{ftm}$ is result of the feature transform module.

4. The method as recited in claim 1, further comprising converting the combined feature map into a 1-dimensional feature vector for each frame before transferring the 1-dimensional feature vector to the long short-term memory (LSTM) module.

5. The method as recited in claim 1, wherein each of the plurality of sequential digital images is converted into a plurality of top-down view images by back-projecting all road pixels into a 3D point cloud and projecting all 3D points onto an x-y plane.

6. The method as recited in claim 1, further comprising conveying an output from the long short-term memory (LSTM) module into a multi-layer perceptron (MLP).

7. A processing system for producing a road layout model, comprising:
one or more processor devices;
a memory in communication with at least one of the one or more processor devices; and
a display screen;
wherein the processing system includes a graphical modeler configured to receive as input a plurality of sequential digital images, wherein the digital images are of a perspective view, convert each of the plurality of sequential digital images into a top-down view image using a processor through semantic segmentation, wherein each object in the sequential digital images is segmented by clustering pixels of the object into ground truth classes, and assigning a depth value to each pixel, convey a top-down view image of time t to a neural network that performs a feature transform on the top-down view image of time t to form a feature map of time t, and convey a top-down view image of time t+1 to the neural network that performs a feature transform on the top-down view image of time t+1 to form a feature map of time t+1;
a feature transform module configured to receive the feature map of the top-down view image of time t and warp the feature map of time t to a time t+1;
a combiner configured to combine the warped feature map of time t with the feature map of time t+1 to form a combined feature map;
a long short-term memory (LSTM) module configured to receive the combined feature map and to generate the road layout model; and
the processor device is configured to transmit the road layout model to the display screen for presentation to a user.

8. The processing system as recited in claim 7, wherein the road layout model is displayed to a user in a vehicle to make driving decisions in real time.

9. The processing system as recited in claim 7, wherein the feature maps are combined using a simple weighted summation, $f_{com}(F^t, g_{ftm}(F^{t-1}))=\alpha \cdot F^t+(1-\alpha) \cdot g_{ftm}(F^{t-1})$, wherein $f_{com}$ represents a combined feature map, $F^t$ is the feature map of time t, $F^{t-1}$ is the feature map of time t−1, and $g_{ftm}$ is result of the feature transform module.

10. The processing system as recited in claim 7, further comprising converting the combined feature map into a 1-dimensional feature vector for each frame before transferring the 1-dimensional feature vector to the long short-term memory (LSTM) module.

11. The processing system as recited in claim 7, wherein each of the plurality of sequential digital images is converted into a top-down view image by back-projecting all road pixels into a 3D point cloud and projecting all 3D points onto an x-y plane.

12. The processing system as recited in claim 7, further comprising conveying an output from the long short-term memory (LSTM) module into a multi-layer perceptron (MLP).

13. A non-transitory computer readable storage medium comprising a computer readable program for producing a road layout model, wherein the computer readable program when executed on a computer causes the computer to perform the steps of:
capturing a plurality of sequential digital images using a video camera, wherein the digital images are of a perspective view;
converting each of the plurality of sequential digital images to a top-down view image using a processor through semantic segmentation, wherein each object in the sequential digital images is segmented by clustering pixels of the object into ground truth classes, and assigning a depth value to each pixel;
conveying a top-down view image of time t to a neural network that performs a feature transform on the top-down view image of time t to form a feature map of time t;
transferring the feature map of the top-down view image of time t into a feature transform module configured to warp the feature map of time t to a time t+1;
conveying a top-down view image of time t+1 to the neural network that performs a feature transform on the top-down view image of time t+1 to form a feature map of time t+1;
combining the warped feature map of time t with the feature map of time t+1 to form a combined feature map;
transferring the combined feature map to a long short-term memory (LSTM) module to generate the road layout model; and
displaying the road layout model to a user.

14. The computer readable program as recited in claim 13, wherein the road layout model is displayed to a user in a vehicle to make driving decisions in real time.

15. The computer readable program as recited in claim 13, wherein the feature maps are combined using a simple weighted summation, $f_{com}(F^t, g_{ftm}(F^{t-1}))=\alpha \cdot F^t+(1-\alpha) \cdot g_{ftm}(F^{t-1})$, wherein $f_{com}$ represents a combined feature map, $F^t$ is the feature map of time t, $F^{t-1}$ is the feature map of time t−1, and $g_{ftm}$ is result of the feature transform module.

16. The computer readable program as recited in claim 13, further comprising converting the combined feature map into a 1-dimensional feature vector for each frame before transferring the 1-dimensional feature vector to the long short-term memory (LSTM) module.

17. The computer readable program as recited in claim 13, wherein each of the plurality of sequential digital images is converted into a top-down view image by back-projecting all road pixels into a 3D point cloud and projecting all 3D points onto an x-y plane.

18. The computer readable program as recited in claim 13, further comprising conveying an output from the long short-term memory (LSTM) module into a multi-layer perceptron (MLP).

* * * * *